(12) United States Patent
Susaki et al.

(10) Patent No.: US 7,805,484 B2
(45) Date of Patent: Sep. 28, 2010

(54) INFORMATION DELIVERY SYSTEM AND METHOD USING POSITIONAL INFORMATION

(75) Inventors: Tomoko Susaki, Yokohama (JP); Makoto Takahashi, Tokyo (JP); Yoshitaka Sato, Kawasaki (JP); Takaaki Yayoi, Yokohama (JP); Shinichi Takahashi, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 185 days.

(21) Appl. No.: 12/004,478

(22) Filed: Dec. 21, 2007

(65) Prior Publication Data

US 2008/0270530 A1  Oct. 30, 2008

(30) Foreign Application Priority Data

Apr. 26, 2007  (JP)  ............................ 2007-116701

(51) Int. Cl.
G06F 15/16  (2006.01)
H04W 24/00  (2009.01)
(52) U.S. Cl. .................................... 709/203; 455/456.1
(58) Field of Classification Search ................. 709/203
See application file for complete search history.

(56) References Cited

U.S. PATENT DOCUMENTS

| 6,834,195 | B2* | 12/2004 | Brandenberg et al. ..... 455/456.3 |
| 2003/0069683 | A1* | 4/2003 | Lapidot et al. .............. 701/117 |
| 2005/0027591 | A9* | 2/2005 | Gailey et al. .................. 705/14 |
| 2005/0075116 | A1* | 4/2005 | Laird et al. .............. 455/456.3 |
| 2005/0221812 | A9* | 10/2005 | Gailey et al. ............. 455/422.1 |
| 2008/0186164 | A1* | 8/2008 | Emigh et al. ........... 340/539.13 |

FOREIGN PATENT DOCUMENTS

JP  2006-323790  11/2006

* cited by examiner

*Primary Examiner*—Benjamin R Bruckart
*Assistant Examiner*—Gerald Smarth
(74) *Attorney, Agent, or Firm*—Foley & Lardner LLP

(57) ABSTRACT

A personal digital assistant includes an input section for designating, when a user requests information based on positional information, whether user desires to acquire wide-area information or narrow-area information. If acquisition of narrow-area information is desired, a managing server removes noise by a noise removal processing section which makes a check to determine whether or not the wide-area information is noise. Hence, information desired by the user is preferentially displayed.

19 Claims, 15 Drawing Sheets

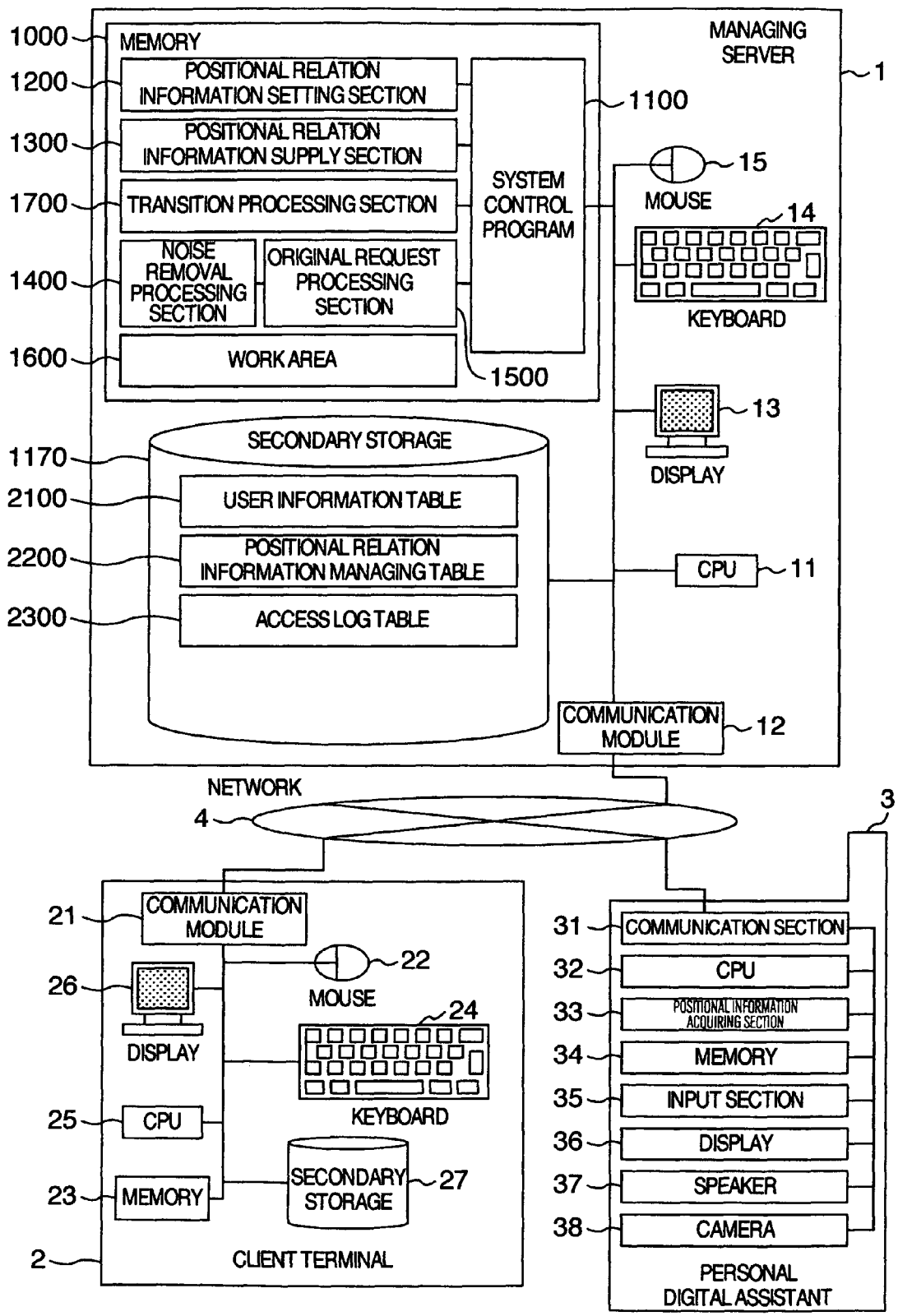

FIG.2

USER INFORMATION TABLE 2100

| USER KEY (2101) | PERSONAL DIGITAL ASSISTANT KEY (2102) |
|---|---|
| AAAA | ASSISTANT KEY A |
| BBBB | ASSISTANT KEY B |
|  |  |

FIG.3

POSITIONAL RELATION INFORMATION MANAGING TABLE 2200

| DELIVERY INFORMATION IDENTIFIER (2201) | SETTING POSITION (2202) | RANGE (SQUARE) (2203) | POSITIONAL RELATION INFORMATION TITLE (2204) | POSITIONAL RELATION INFORMATION TEXT (2205) |
|---|---|---|---|---|
| DELIVERY INFORMATION 1 | (35.5030, 139.5347) | 0.5 km | POSITIONAL RELATION INFORMATION 1 | TEXT 1 |
| DELIVERY INFORMATION 2 | (35.5030, 139.5345) | 1 km | POSITIONAL RELATION INFORMATION 2 | TEXT 2 |
| DELIVERY INFORMATION 3 | (35.5022, 138.5127) | 1.5 km | POSITIONAL RELATION INFORMATION 3 | TEXT 3 |
| DELIVERY INFORMATION 4 | (35.0027, 137.0333) | 0.5 km | POSITIONAL RELATION INFORMATION 4 | TEXT 4 |
|  |  |  |  |  |

ACCESS LOG TABLE 2300

| REQUEST IDENTIFIER 2301 | ACQUISITION POSITION 2302 | DELIVERY INFORMATION IDENTIFIER 2303 |
|---|---|---|
| NOTIFICATION 1 | (35.5039, 139.5343) | DELIVERY INFORMATION 2 |
| NOTIFICATION 2 | (35.5030, 139.5359) | DELIVERY INFORMATION 1 |
| NOTIFICATION 3 | (35.5032, 138.5119) | DELIVERY INFORMATION 3 |
| NOTIFICATION 4 | (35.5024, 139.5346) | DELIVERY INFORMATION 2 |
| NOTIFICATION 5 | (35.5031, 139.5401) | DELIVERY INFORMATION 1 |
| NOTIFICATION 6 | (35.5030, 139.5400) | DELIVERY INFORMATION 1 |
|  |  |  |

FIG.6

```
START
  ↓
RECEIVE SETTING REQUEST  ~1201
  ↓
UPDATE POSITIONAL RELATION
INFORMATION MANAGING TABLE 2200  ~1202
  ↓
END
```

FIG.7

| SETTING POSITION | SUPPLY RANGE | POSITIONAL RELATION INFORMATION TITLE | POSITIONAL RELATION INFORMATION TEXT |
|---|---|---|---|
| (35.502029, 139.534757) | 0.5km | RECOMMENDED ICE-CREAM INFORMATION | YOU GET REDUCTION COUPON IF YOU EAT TWO ICE CREAMS OF THIS SHOP |
| 2311 | 2312 | 2313 | 2314 |

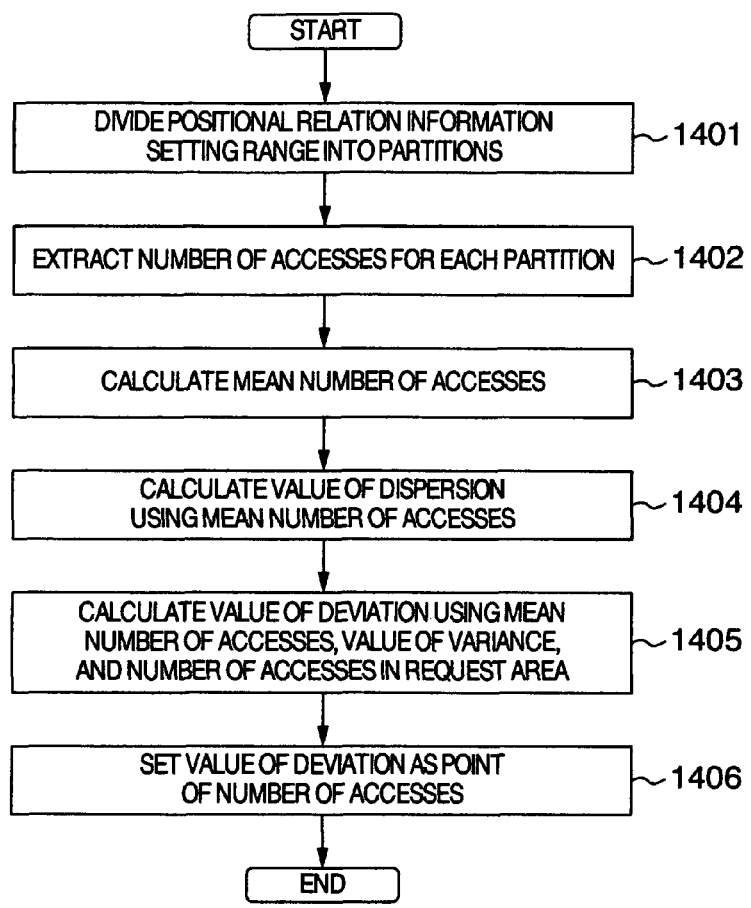

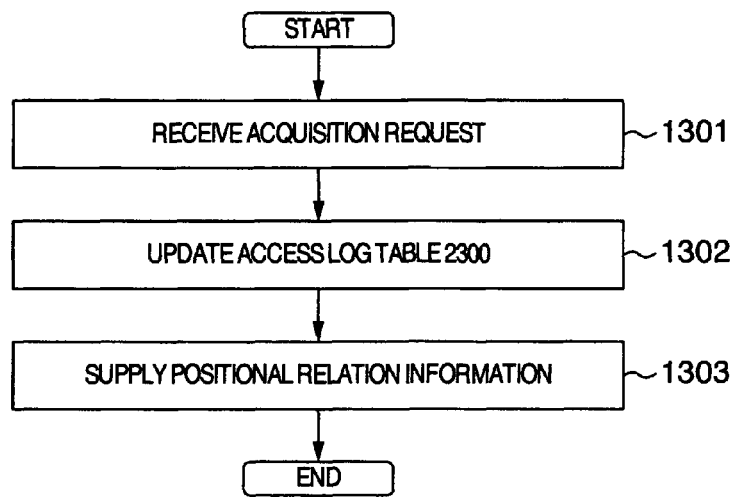

FIG.20

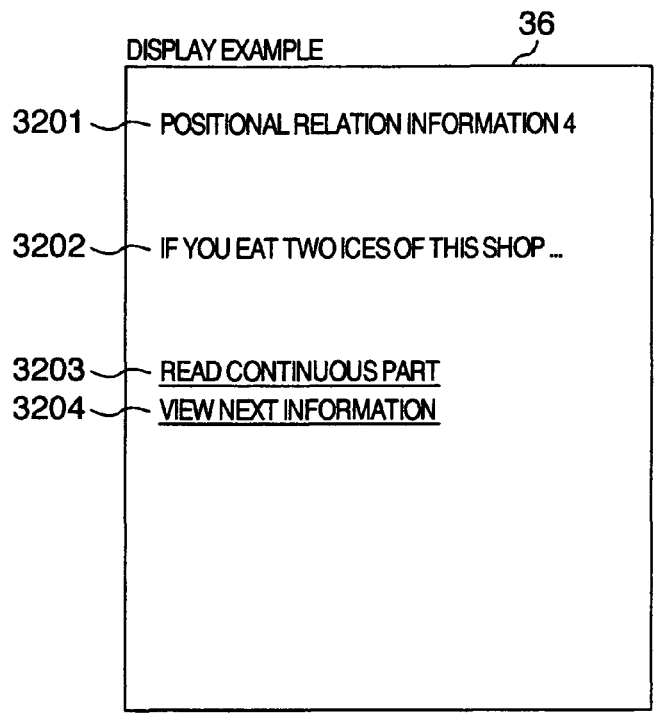

DISPLAY EXAMPLE 36

- 3201 — POSITIONAL RELATION INFORMATION 4
- 3202 — IF YOU EAT TWO ICES OF THIS SHOP ...
- 3203 — READ CONTINUOUS PART
- 3204 — VIEW NEXT INFORMATION

FIG.21

ACCESS LOG TABLE 2300

| REQUEST IDENTIFIER (2301) | ACQUISITION POSITION (2302) | WEIGHT (2304) | DELIVERY INFORMATION IDENTIFIER (2303) |
|---|---|---|---|
| NOTIFICATION 1 | (35.5039, 139.5343) | 1 | DELIVERY INFORMATION 2 |
| NOTIFICATION 2 | (35.5030, 139.5359) | 2 | DELIVERY INFORMATION 1 |
| NOTIFICATION 3 | (35.5032, 138.5119) | 3 | DELIVERY INFORMATION 3 |
| NOTIFICATION 4 | (35.5024, 139.5346) | 1 | DELIVERY INFORMATION 2 |
| NOTIFICATION 5 | (35.5031, 139.5401) | 2 | DELIVERY INFORMATION 1 |
| NOTIFICATION 6 | (35.5030, 139.5400) | 2 | DELIVERY INFORMATION 1 |
| | | | |

INFORMATION DELIVERY SYSTEM AND METHOD USING POSITIONAL INFORMATION

INCORPORATION BY REFERENCE

The present application claims priority from Japanese application JP2007-116701 filed on Apr. 26, 2007, the content of which is hereby incorporated by reference into this application.

BACKGROUND OF THE INVENTION

The present invention relates to an information delivery system and an information delivery method using positional information in which when an actual position of a user (to be referred to as a user current position hereinbelow) is in a limited space defined in the actual world (to be referred to as a delivery range hereinbelow), information beforehand related to the delivery range (to be referred to as positional relation information hereinbelow) is supplied to the user.

Due to recent wide spread of the Personal Handyphone System (PHS) and portable telephone terminals, it is possible for the user to communicate data via networks including the internet, for example, by e-mail at any position by using communication functions of a personal digital assistant. Also, the user can obtain positional information of his or her current position by use of a positional information acquiring function of the portable digital assistant, for example, by using the Global Positioning System (GPS). This leads to increasing spread of information providing systems operating on the basis of positional information, namely, information providing systems using the communication functions and the positional information acquiring function.

In the information providing system based on positional information, the user obtains positional information representing the current user position by the positional information acquiring function of the personal digital assistant and transmits the positional information to the information providing system by use of the communication function of the personal digital assistant. The information providing system then transmits positional relation information to the user, the information being associated with a delivery range including the current user position according to the received positional information. By use of the information providing system, it is possible for the user to easily obtain positional relation information corresponding to the current user position.

JP-A-2006-323790 describes a related art of the information providing system using positional information. According to the system, information retrieved on the basis of positional information items are classified into categories and then a rank is assigned to each of information items to provide the information items to the user in a descending order of the ranks. It is hence more likely that information items which the user desires are displayed with higher priority.

SUMMARY OF THE INVENTION

However, in general, while information with the delivery range set to a wide area is likely to be frequently accessed, information with the delivery range set to a narrow area is likely to be less frequently accessed. From the viewpoint of the number of accesses, the information set to a narrow area is buried in or concealed by the information set to a wide area. Assume an example in which guide information of an entire zoo is set as positional relation information with the overall zoo area designated as the delivery area and explanatory information of elephants is set as positional relation information with the area in front of a cage of elephants designated as the delivery range. In a situation wherein it is desired to obtain information of elephants when the current user position is in front of the elephant cage, since the current user position is also included in the overall zoo area, the number of accesses to information which can also be utilized as information of the overall zoo area exceeds that of information of elephants. Therefore, information which can also be utilized as information of the overall zoo is assigned with a higher rank. This leads to a problem in which even the current user position is in front of the elephant cage, it is not possible that the information of elephants is displayed with higher priority.

It is therefore an object of the present invention, which has been devised in consideration of the related art, to provide an information delivery system and an information delivery method using positional information capable of removing the problem of the related art.

In an example of the present invention, a check is made to determine whether the user desires information of a narrow delivery range (to be referred to as a narrow range hereinbelow) or information of a wide delivery range (to be referred to as a wide range hereinbelow). If the user desires information of a narrow range, a check is made to determine whether or not information of a wide range is noise to preferentially display the information desired by the user.

To achieve the object, according to an information delivery system and an information delivery method using positional information of the present invention, if the user desires information of a narrow range, a check is made to determine whether or not information of a wide range is noise. If it is determined that the wide-range information is noise, the wide-range information is deleted.

According to the present invention, depending on whether the user desires wide-range information or narrow-range information, it is possible to preferentially supply appropriate information to the user.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing an overall configuration of an information delivery system using positional information in an embodiment of the present invention;

FIG. 2 is a block diagram showing in detail data items stored in a user information table 2100;

FIG. 3 is a block diagram showing in detail data items stored in a positional relation information managing table 2200;

FIG. 6 is a flowchart to explain processing of a positional relation information setting section 1200 of a managing server 1;

FIG. 7 is a diagram showing a concrete example of setting request information;

FIG. 9 is a flowchart to explain processing of a noise removing section 1400 of the managing server 1;

FIG. 10 is a diagram schematically showing allocation of supply information and allocation of access logs in a request area associated with a user request for positional relation information;

FIG. 11 is a flowchart to explain processing of a positional relation information supply section 1300 of the managing server 1;

FIG. 12 is a diagram showing a concrete example of an acquisition request;

FIG. 20 is a display example on a personal digital assistant 3 when an acquisition request is issued for positional relation information;

FIG. 21 is a diagram showing in detail data items stored in an access log table 2300 of a second embodiment;

DESCRIPTION OF THE EMBODIMENTS

Figures 4, 5:
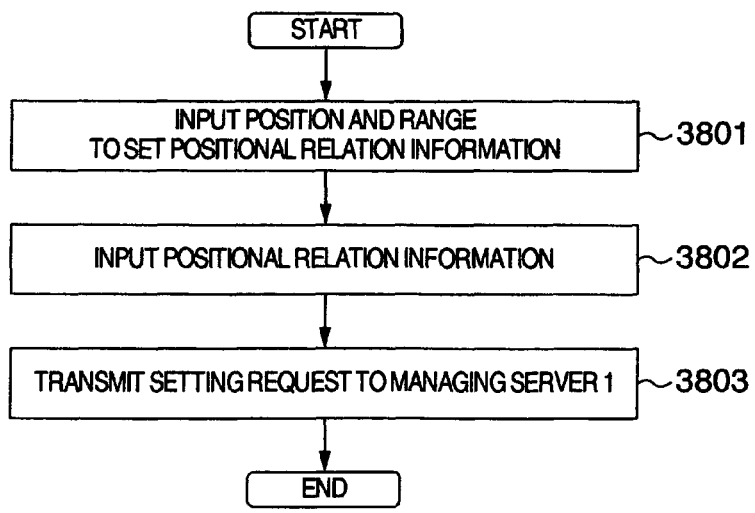
FIG. 4 is a block diagram showing in detail data items stored in an access log table 2300.
FIG. 5 is a flowchart to explain a procedure to set positional relation information in a client terminal 2.

Referring now to the drawings, description will be given of embodiments of the present invention.

First Embodiment

Overall System Configuration

FIG. 1 shows an overall configuration of an information delivery system on the basis of positional information according to an embodiment of the present invention. The information delivery system of FIG. 1 includes a managing server 1, a client terminal 2, a personal digital assistant 3 as a portable terminal, and a network 4 connecting the constituent elements to each other.

The client terminal 2 includes a communication module 21, a mouse 22, a memory 23, a keyboard 24, a Central Processing Unit (CPU) 25, a display 26, and a secondary storage 27. The client terminal 2 connects via the communication module 21 to the network 4 and then communicates data with the managing server 1 to set positional relation information as supply information associated with positions and to acquire positional relation information.

The personal digital assistant 3 includes a communication section 31, a CPU 32, a positional information acquiring section 33, a memory 34, an input section 35, a display 36, a speaker section 37, and a camera section 38. The personal digital assistant 3 obtains positional information thereof by the positional information acquiring section 33 and then connects via the communication section 31 to the network 4 to communicate data with the managing server 1 to obtain positional relation information.

Although the first embodiment includes one client terminal 2 and one personal digital assistant 3, there may be disposed two or more client terminals 2 and two or more personal digital assistant 3. The present invention is also applicable to a case in which no client terminal 2 is disposed.

The managing server 1 includes a CPU 11, a communication module 12, a display 13, a keyboard 14, a mouse 15, a memory 1000, and a secondary storage 1170. The secondary storage 1170 includes a user information table 2100 to keep therein user information, a positional relation information managing table 2200, and an access log table 2300 to record positional relation information to which users have referred to. The memory 1000 includes a system control program 1100 which selects processing on the basis of a request from a user to execute the processing, and a work area 1600 as a temporary storage. The system control program 1100 includes a positional relation information setting section 1200 to process a request (to be referred to as a setting request hereinbelow) received from the client terminal 2 to set information, a portable-terminal (PT) request processing section 1500 to process a request (to be referred to as a portable-terminal (PT) request hereinbelow) received from the personal digital assistant 3 to request positional relation information, a positional relation information supply section 1300 to supply positional relation information requested by a request (to be referred to as an acquisition request hereinbelow) to acquire positional relation information selected by the user from a positional relation information list processed by the PT request processing section 1500, and a transition processing section 1700 to process a request (to be referred to as a transition request hereinbelow) to make a transition to another information request or another page when positional relation information is displayed. The PT request processing section 1500 includes a noise removal processing section 1400 to select information with higher priority at a position requested by the user.

[Tables in Secondary Storage]

FIG. 2 shows details of data items stored in the user information table 2100. This table is disposed to store information of users of the information delivery system based on positional information. To supply positional relation information, the table 2100 is referred to determine a user. Each entry of the table 2100 includes a user key column 2101 to indicate information which uniquely identifies a user and a personal digital assistant key column 2102 to indicate information which uniquely identifies a personal digital assistant.

It is assumed in the embodiment that a user is uniquely identified at service login by acquiring a record of which the personal digital assistant key matches the value of the personal digital assistant key column 2102 in the user information table 2100. However, the present invention is also applicable to a case in which the user is uniquely identified in any other method.

Also, the present invention is applicable to a case in which the user identification is not carried out.

FIG. 3 shows details of data items stored in the positional relation information managing table 2200. The table 2200 is disposed to store positional relation information set by the client terminal 2. When the managing server 1 executes the positional relation information setting section 1200, a record is added to the table 2200 (also at record modification and deletion).

Each entry of the table 2200 includes a delivery information identifier column 2201 to uniquely identify positional relation information set thereto, a setting position column 2202 to indicate a position to which the information is set, a range column 2203 to indicate a setting range, a title column 2204 to store a title of positional relation information actually supplied to the user, and a positional relation information text column 2205 to store a text of the positional relation information. The positional relation information title column 2204 stores information to constitute a ranking list which is displayed on the display 36 of the personal digital assistant 3 when positional relation information is requested by an PT request. The positional relation information text column 2205 stores information to be displayed on the display 36 of the personal digital assistant 3 when positional relation information is selected from the ranking list and an acquisition request is indicated.

FIG. 4 shows details of data items in the access log table 2300. This table is disposed to record an event in which the user selects from the personal digital assistant 3 positional relation information from a ranking list displayed on the display 36 of the personal digital assistant 3 in response to a PT request sent from the personal digital assistant 3 to the managing server 1 and then the user issues an acquisition request. The table 2300 includes a request identifier column 2301 to uniquely identify the acquisition request, an acquisition position column 2302 to indicate a position for which the acquisition request is issued, and a delivery information identifier column 2303 to store a delivery information identifier for which the acquisition request is issued.

Although the access log information does not include the user key information in the embodiment, the present invention is applicable even if a user key column to store the user key information is added thereto.

[Overall Processing Flow]

Description will next be given of a flow of processing in the overall positional relation information system.

First, description will be given of processing of the system control program 1100 in the managing server 1.

The system control program 1100 selects processing in response to a request which is issued from the client terminal 2 or the personal digital assistant 3 and which is received by the communication module 2, and then executes the processing thus selected.

First, the program 1100 determines processing on the basis of a type of the request received as above. If a setting request is received, the program 1100 executes the positional relation information setting section 1200. If a PT request is received, the program 1100 executes the PT request processing section 1500. If the noise removal processing is required, the program 1100 executes the noise removal processing section 1400. If an acquisition request is received, the program 1100 executes the positional relation information supply section 1300. If a transition request is received, the program 1100 executes the transition processing section 1700.

Next, description will be given of processing to set positional relation information by the client terminal 2.

FIG. 5 is a flowchart of a procedure to set positional relation information by the client terminal 2.

The user inputs a position and a range to set information. Specifically, by use of the mouse 22 or the keyboard 24, the user selects items from map information displayed on the display 26 of the client terminal 2 (step 3801).

Next, the user inputs a title and a text of positional relation information by inputting a text using the mouse 22 and/or the keyboard 24 (step 3802).

The user then transmits, by use of the communication module 21 of the client terminal 2, a setting request inputted in steps 3801 and 3802 via the network 4 to the managing server 1 (step 3803).

It is assumed in the embodiment that the positional relation information is set by using the client terminal 2. However, the present invention is applicable to also a case in which it is assumed that the positional relation information is set by use of the display 36 and the input section 35 of the personal digital assistant 3.

Also, it is assumed in the embodiment that the setting position of the positional relation information is designated by use of the display 26, the mouse 2, and the keyboard 24 of the client terminal 2. However, the present invention is applicable also to a case in which it is assumed that the setting position is designated by use of a position acquired by the positional information acquiring section 33 of the personal digital assistant 3.

It is also assumed in the embodiment that a text is inputted for the title and the text of the positional relation information. However, the present invention is applicable also to a case in which it is assumed that an image and a mobile picture are inputted for this purpose.

Description will now be given of processing of the positional relation information setting section 1200 when the managing server 1 receives a setting request from the client terminal 2.

FIG. 6 is a flowchart of processing of the positional relation information setting section 1200 in the managing server 1. The section 1200 is a program which is executed at reception of a setting request transmitted as shown in FIG. 5.

According to the setting request, the setting section 1200 adds a record to the positional relation information managing table 2200.

The setting section 1200 first receives the setting request, which is sent from the client terminal 2, by the communication module 12 (step 1201).

The setting section 1200 then adds a record to the positional relation information managing table 2200. Specifically, the setting section sets a unique value in the delivery information identifier column, a setting position, a setting range, a positional relation information title, and a positional relation information text included in the setting request respectively to the delivery information identifier column 2201, the setting position column 2202, the range column 2203, the positional relation information title column 2204, and the positional relation information text column 2205 of the table 2200 (step 1202).

Next, description will be given of processing of the PT request processing section 1500 when the managing server 1 receives a PT request from the personal digital assistance 3.

Figure 8:
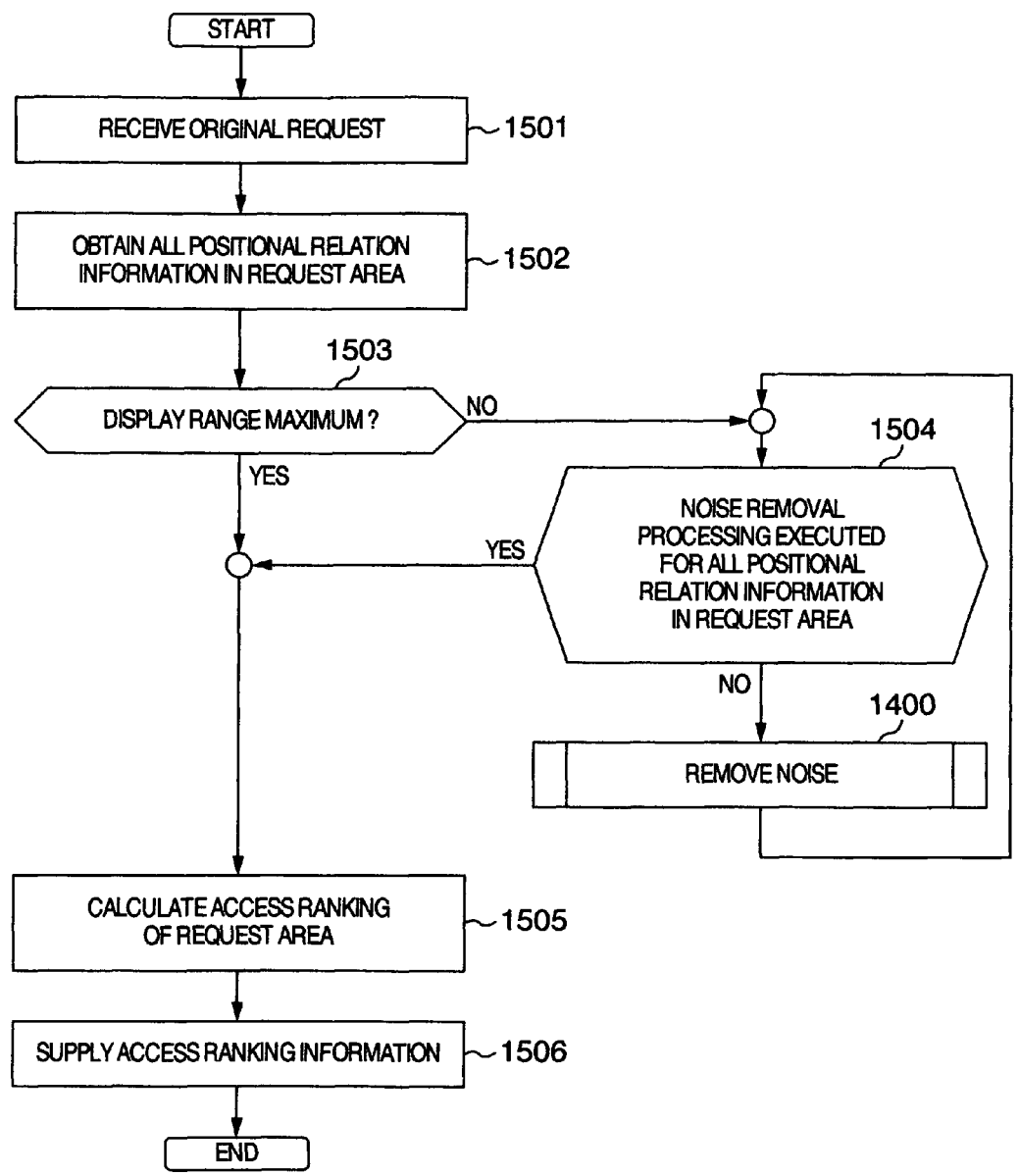
FIG. 8 is a flowchart to explain processing of a request processing section 1500 of the managing server 1.

FIG. 8 is a flowchart of processing of the PT request processing section 1500 in the managing server 1. The processing section 1500 is a program which is executed when a PT request is received from the personal digital assistance 3.

The PT request processing section 1500 receives by the communication module 12 the PT request sent from the personal digital assistant 3 (step 1501).

The processing section 150 then obtains from the positional relation information managing table 2200 all positional relation information items set in a request area surrounding the request position of the PT request, the area being defined by a square having edges apart from one half of the display range included in the PT request (step 1502).

The processing section 1500 makes a check to determine whether or not the value of the display range is "maximum" (step 1503). If the display range is "maximum", the processing section 1500 obtains an access log corresponding to the positional relation information acquired in step 1502 to calculate an access ranking (step 1505).

If the display range is other than "maximum", the processing section 1500 determines whether or not the noise removal processing has been executed for the positional relation information items (step 1504). For any positional relation information item for which the noise removal processing has not been executed yet, the processing section 1500 executes the noise removal processing by the noise removal processing section 1400 (step 1400).

In this connection, "noise" indicates an access log which is selected from the access logs associated with accesses to the positional relation information and for which it is considered that the acquisition of the positional relation information at the position is not important for the user.

If the noise removal has been finished for all positional relation items, the PT request processing section 1500 calculates the access ranking on the basis of the number of the accesses (step 1505).

According to the access ranking, the processing section 1500 creates a ranking list using the positional relation information title and the delivery information identifier and then transmits by the communication section 12 the ranking list via the network 4 to the personal digital assistant 3 (step 1506) to thereby terminate the processing.

In the embodiment, the wide range is defined according to only the maximum value of the range in the system. However, the present invention is also applicable to a situation in which threshold value (Km) is designated to define the wide and narrow areas in the PT request processing section 1500 such that if the value of the display range is equal to or more than the threshold value, the range is regarded as a wide range.

Additionally, the present invention is also applicable to a configuration in which when a narrow-range information request is issued by use of a narrow-range information request module, the communication section 31 of the personal digital assistant 3 sends information of the narrow-area request together with the PT request via the network 4 to the managing server 1. In this operation, the managing server 1 makes a check by the PT request processing section 1500 to determine whether or not a narrow range has been requested in step 1503 of FIG. 8. If this is the case, the system executes step 1505.

The present invention is also applicable as follows. At access to the positional relation information, the display range on the display 36 of the personal digital assistant 3 is recorded in the access log. There is disposed a module to assign a weight to the access to indicate whether or not the access is effective for the user. The weight is also recorded in the access log. For each display range, the system calculates a mean value of weights. Furthermore, the system calculates a mean value of the weights in all display ranges. The means weight value of each display range is compared with the mean weight value of all display ranges in a descending order of display range areas. A display range with the mean weight value less than the mean weight value of the all display ranges is assumed as a threshold value for the narrow and wide areas. The PT request processing section 1500 of the managing server 1 employs a method to determine whether the range under consideration is a wide range or a narrow range in step 1503 of FIG. 8.

Also, the present invention is applicable to a case in which the system uses a method to determine, as a narrow range, a display range browsed for a predetermined period of time, e.g., ten seconds on the display 36 of the personal digital assistant 3. The period of time may be measured by the personal digital assistant 3 or the managing server 1.

Although all access logs are used for the ranking list in the embodiment, the present invention is applicable also to a situation in which the ranking list includes only the access logs created during a fixed period of time.

In addition, the present invention is applicable also to a situation in which a user key column is added to the access log to thereby create the access ranking list for each user.

Furthermore, the present invention is applicable to a situation in which a column to record an item indicating whether the information is accessed as information of a wide area or as information of a narrow area is added for the access log to obtain only the access logs in a range requested by the user.

FIG. 9 is a flowchart of processing of the noise removal processing section 1400 in the managing server 1. This section is a program to remove noise from the access logs.

The processing section 1400 divides the positional relation information setting range into partitions (step 1401). In the embodiment, the partition has a size which is substantially equal to the size of the request area calculated when the personal digital assistant 3 issues a PT request. However, the noise can be removed even if the partition size is smaller or larger than the request area size. When the display range is other than the maximum value in FIG. 8, the display range is set according to the request area size, which is employed as the partition size.

Next, the processing section 1400 extracts from the access log table 2300 the number of accesses to the positional relation information for each partition (step 1402). On the basis of a results of the extraction, the section 1400 calculates a mean value of the number of accesses using expression 1 (step 1403). In the expression, Xi indicates the number of accesses for each partition and n is the number of partitions. According to expression 1, the total of the numbers of accesses of the respective partitions is first calculated, and then the total is divided by the number of partitions to obtain the mean value. Then, a value of variance is calculated using expression 2 (step 1404). On the basis of the mean value of the number of accesses, the variance $\sigma^2$, and the number of accesses in the request area, the processing section 1400 calculates a value of deviation by use of expression 3 (step 1405). In expression 3, the number of accesses in the range indicates the number of accesses in the request area. The value of variance is set as a point of the number of accesses of the positional relation information (step 1406).

$$\overline{X} = \frac{1}{n} \sum_{i=1}^{n} Xi \qquad (1)$$

$$\sigma_x^2 = \frac{1}{n-1} \left\{ \begin{array}{c} (X_1 - \overline{X})^2 + (X_2 - \overline{X})^2 + \\ K + (X_n - \overline{X})^2 \end{array} \right\} \qquad (2)$$

$$\text{Value of deviation} = \frac{10\,(\text{number of accesses in range} - \overline{X})}{\sqrt{\sigma}} + 50 \qquad (3)$$

In the embodiment, the noise removal method is a method to calculate the value of deviation. However, the present invention is applicable also to a case in which the mean value of the number of accesses is calculated using expression 1. The accesses to partitions of which the number of accesses is less than the mean value of the number of accesses are regarded as noise. The number of accesses for such partitions is assumed as zero.

Additionally, according to the embodiment, the noise removal processing is executed for all positional relation information items set to the display range. However, the present invention is applicable also to a case in which the noise removal processing is not executed for the positional relation information items of which the number of accesses is equal to or more than a fixed value. The information items are preferentially displayed as information items with a higher access ranking.

The present invention is applicable also to a case in which the noise removal processing is not executed for the positional relation information items of which the number of accesses is equal to or less than a fixed value, and the information items are preferentially displayed as information items with a lower access ranking.

Moreover, the present invention is applicable also to a case in which the access ranking calculated using positional relation information set in a wide-range display area is compared with the access ranking calculated using positional relation information set in a narrow-range display area, and the overlapped portion therebetween is removed to create the access ranking on the basis of the remaining positional relation information to thereby display the access ranking.

Description will now be given of processing of the positional relation information supply section 1300 when the managing server 1 receives an acquisition request from the personal digital assistant 3.

FIG. 11 is a flowchart showing processing of the positional relation information supply section 1300 in the managing server 1. This section is a program which is executed at reception of an acquisition request from the personal digital assistant 3.

The supply section 1300 receives by the communication module 12 an acquisition request sent from the personal digital assistant 3 (step 1301).

The supply section 1300 adds a record to the access log table 2300 by setting a unique value for the request identifier column, the positional relation information, and the delivery information identifier contained in the acquisition request to the request identifier column 2301, the positional relation information column 2302, and the delivery information identifier column 2303 (step 1302). The supply section 1300 obtains from the positional relation information managing table 2200 a positional relation information text 2205 of a record including the delivery information identifier column 2201 matching delivery information identifier indicated by the acquisition request. The supply section 1300 transmits by the communication module 12 the text 2205 via the network 4 to the personal digital assistant 3 (step 1303) and then terminates the processing. In the operation, if the text 2205 includes a large amount of information and cannot be displayed on the display of the digital assistant 3 at a time, only a part of the text is transmitted.

Next, description will be given of processing of the transition processing section 1700 when the managing server 1 receives a transition request from the personal digital assistant 3.

Figures 13, 14:
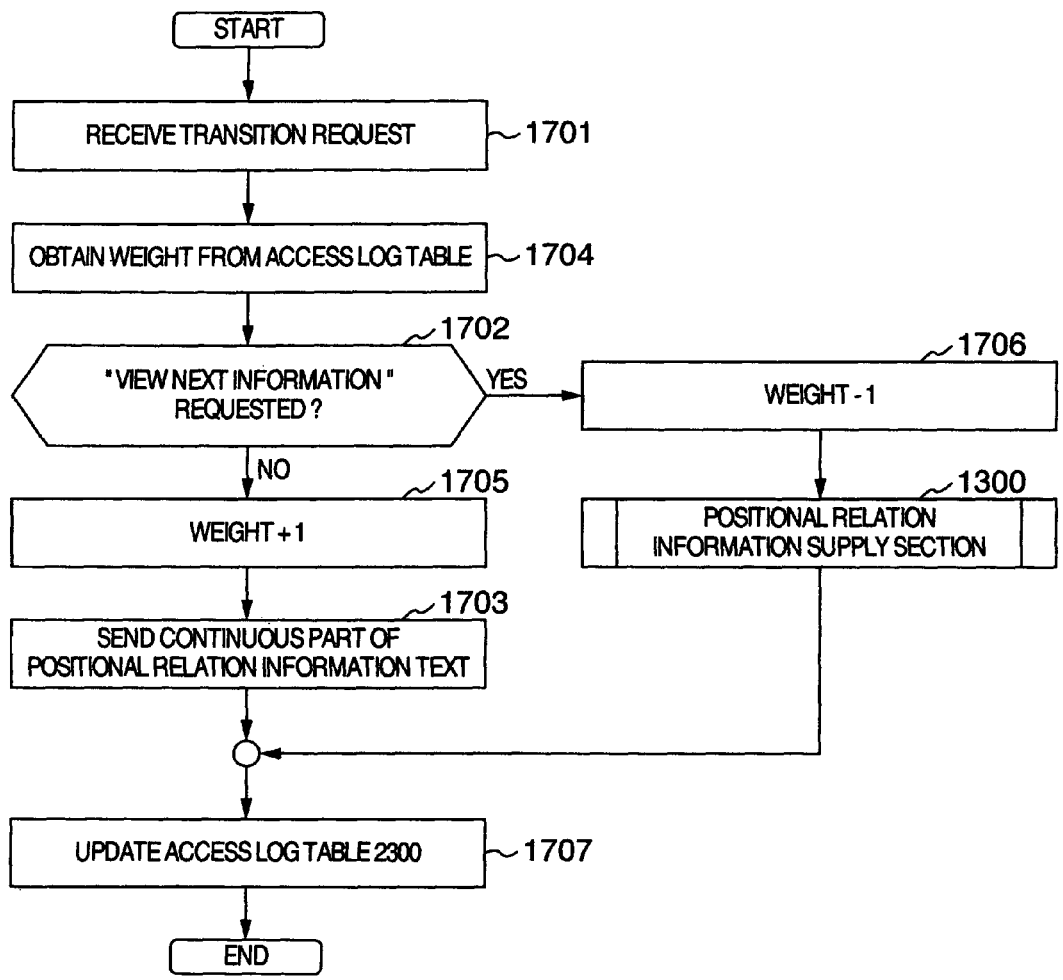
FIG. 13 is a flowchart to explain processing of a transition processing section 1700 of the managing server 1.
FIG. 14 is a diagram showing a concrete example of a transition request.

FIG. 13 is a flowchart to explain processing of the transition processing section 1700 in the managing server 1. This section is a program which is executed when a transition request is received from the personal digital assistant 3.

The processing section 1700 receives by the communication module 12 a transition request sent from the personal digital assistant 3 (step 1701). The section 1700 checks the contents of the transition request. If "view next information" is requested as a result, the processing section 1700 obtains by the positional relation information supply section 1300 the positional relation information text 1305 of the next ranking and then transmits by the communication module 12 the text 1305 via the network 4 to the personal digital assistant 3 (step 1300) to thereby terminate the processing. If "read continuous part" is requested, the processing section 1700 transmits a continuous part of the text of the positional relation information (step 1703) and then terminates the processing.

In the embodiment, the transition processing section 1700 can divide the text into smaller subtexts to transmit the subtexts. However, the present invention is also applicable to a case in which the transition processing section is not employed.

[Concrete Examples of Requests]

Next, description will be given of a concrete example in which the managing server 1 receives a request.

First, description will be given of a concrete example in which the managing server 1 receives a setting request.

FIG. 7 shows a concrete example of setting request information. It is assumed in the information of FIG. 7 that a setting position 2311 is "(35.502039, 139.534757)" representing longitude and latitude information items, a supply range (setting range) 2312 is "0.5 km", a positional relation information title 2313 is "recommended ice information", and a positional relation information title 2314 is "you get discount coupon if you eat two ices of this shop".

In response to the setting request, a record is added to the positional relation information managing table 2200 in a column after the column of delivery information 4. Specifically, the record includes "delivery information 5" in the delivery information identifier column 2201, "(35.502029, 139.534757)" as the setting position 2311 in the setting position column 2202, "0.5 km" as the supply range 2312 in the range column 2303, "recommended ice information" as the positional relation information title 2313 in the positional relation information title column 2204, and "you get discount coupon if you eat two ices of this shop" as the positional relation information text 2314 in the positional relation information text column 2205.

Description will now be given of a concrete example of processing when the managing server 1 receives a PT request. Assume in FIG. 10 that the user issuing a PT request has a user key 3011 set as "AAAA" and the request includes a request position 3012 set as "(35.5039, 139.5343)" and a display range 3013 set as "10 km".

In step 1502 of FIG. 8, the positional relation information managing table 2200 is accessed to obtain therefrom positional relation information set within a range of a display range 3013, i.e., "10 Km" surrounding the request position, i.e., "(35.5039, 139.5343)" contained in the request sent from the user.

In step 1503 of FIG. 8, a check is made to determine whether or not the display range 3013 is "maximum". Assume that the display range 3013 is other than "maximum". The PT request processing section 1500 executes step 1504 of FIG. 8. That is, a check is made to determine whether or not the noise removal processing has already been executed for all positional relation information items in the request area. If there remains any positional relation information item to be processed, the noise removal processing is executed for the item in step 1400 of FIG. 8.

In step 1401 of FIG. 9, the setting range of the positional relation information is divided into partitions. In step 1402, an access log is extracted from the access table 2300 for each partition to obtain the number of accesses. In step 1403, a mean value of the number of accesses is calculated using expression (1). In step 1404, on the basis of the mean value, variance is calculated using expression (2). In step 1405, on the basis of the number of accesses in the request area, the mean value, and the variance, deviation is calculated using expression (3). In step 1406, the deviation is set as the number of accesses to thereby terminate the processing.

When the noise removal processing is executed for all supply information items, the system executes step 1505 of FIG. 8 to create a ranking list including the positional relation information title and the delivery information identifier according to the calculated access ranking. In step 1506, the communication module 12 sends the access ranking information via the network 4 to the personal digital assistant 3 (step 1505) to thereby terminate the processing.

Description will next be given of processing when the managing server 1 receives an acquisition request.

FIG. 12 shows a concrete example of an acquisition request. It is assumed in FIG. 12 that the user having sent an acquisition request has the user key 3021 set as "AAAA", the request position 3022 set as "(35.5039, 139.5343)", and the delivery information identifier 3023 set as "delivery information 1".

In step 1302 of FIG. 11, a record is added to the access log table 2300 according to the acquisition request. Specifically, the record includes the request identifier column 2301 including a unique identifier "notification 7", the acquisition position column 2302 including the acquisition position "(35.5039, 139.5343)" of the acquisition request, and the delivery information identifier column 2303 including the delivery information identifier 3023 "delivery information 1" contained in the request.

Next, description will be given of a concrete example of processing when the managing server 1 receives a transition request.

FIG. 14 shows a concrete example of a transition request. It is assumed in FIG. 14 that the user having sent an acquisition request has the user key 3033 set as "AAAA" and the contents of a request field 3034 designated as "read continuous part".

In step 1702 of FIG. 13, a check is made to determine whether the request field 3034 includes "read continuous part" or "view next information" according to the transition request. Since "read continuous part" has been requested in this example, a continuous part of the positional relation information text is transmitted to the personal digital assistant 3 in step 1703.

[Concrete Example of Noise Removal]

Description will now be given of a concrete example of the noise removal processing in the positional relation information processing section.

Figure 15:
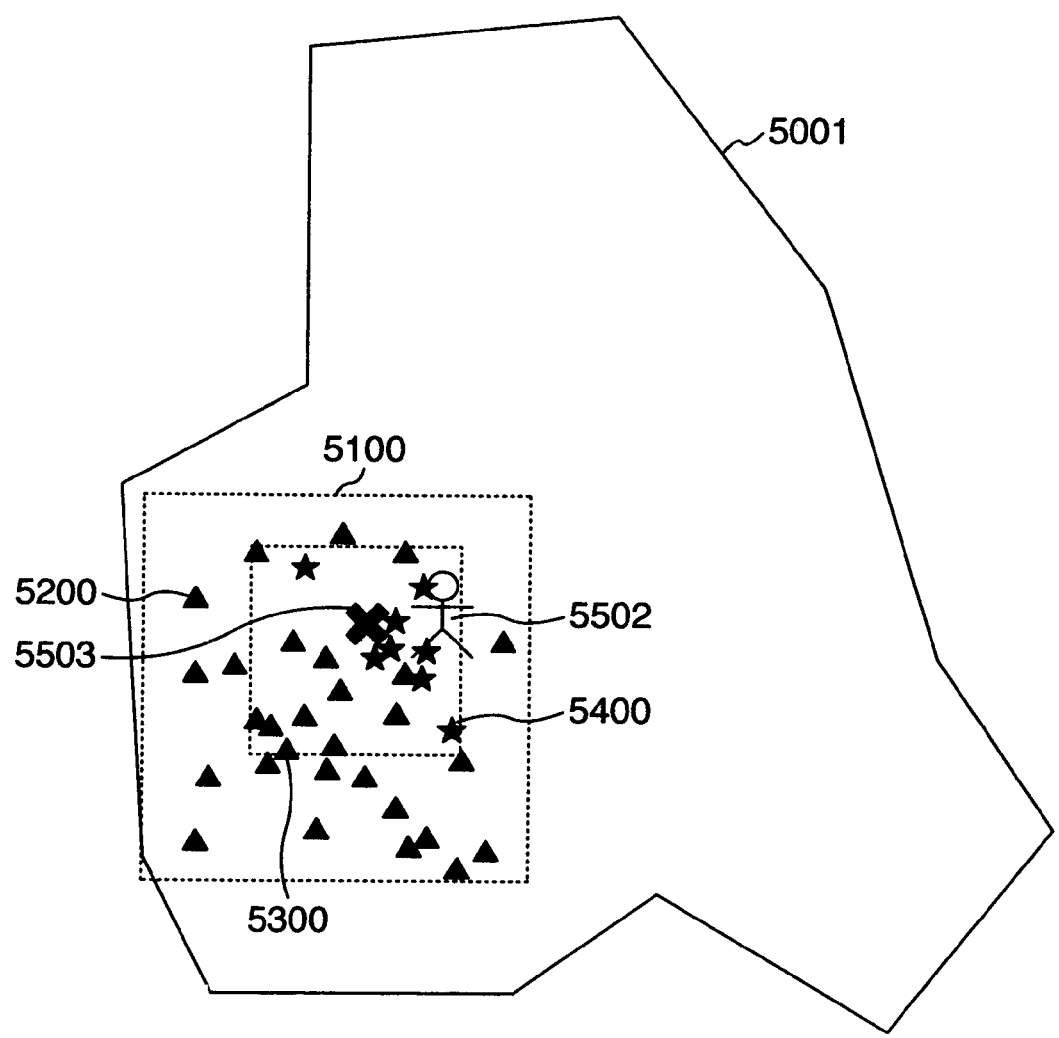
FIG. 15 is a diagram schematically showing allocation of supply information and allocation of access logs in a request area associated with a user request for positional relation information.

FIG. 15 schematically shows allocation of positional relation information items and allocation of access logs in the request area associated with the request for positional relation information associated with the PT request issued from the user.

A solid line 5001 indicates map information. Broken lines 5100 and 5300 are examples of positional relation information items managed by the positional relation information managing table 2200 of the managing server 1. The line 5100 indicates a setting range of positional relation information for which the delivery information identifier 2201 is "delivery information 1", and the line 5300 indicates a setting range of positional relation information for which the delivery information identifier 2201 is "delivery information 2". A reference numeral 5502 indicates a user who sends a PT request from the personal digital assistant 3. A reference numeral 5503 indicates a position from which the PT request is actually transmitted from the personal digital assistant 3. A reference numeral 5200 representing a triangle indicates an access log of access to information for which the delivery information identifier 2201 is "delivery information 1". A reference numeral 5200 indicates an access log of access to information for which the delivery information identifier 2201 is "delivery information 2".

Figure 16:
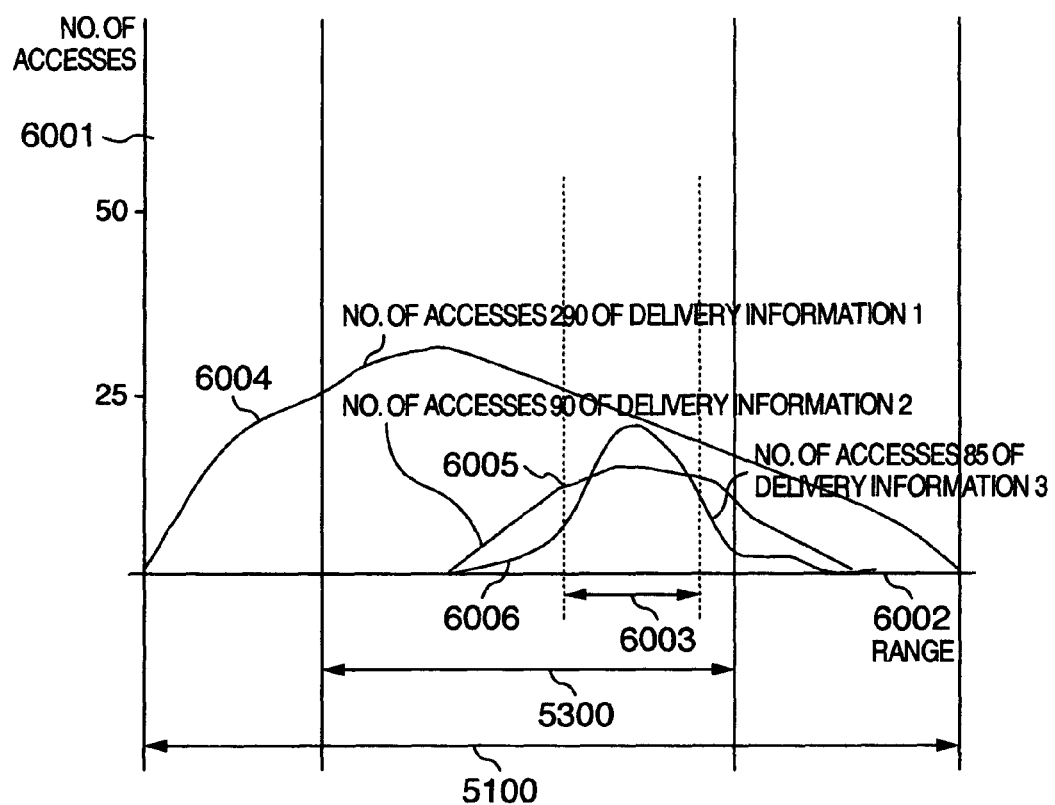
FIG. 16 is a graph showing accesses in FIG. 5.

FIG. 16 is a graph showing a concrete example of FIG. 15.

In the graph, the ordinate 6001 represents the number of accesses and the abscissa represents the setting range of the positional relation information. A reference numeral 6004 indicates a graph representing the number of accesses for which the delivery information identifier 2201 of the positional relation information managing table 2200 is "delivery information 1". A reference numeral 6005 indicates a graph representing the number of accesses for which the identifier 2201 of the information managing table 2200 is "delivery information 2". A reference numeral 6006 indicates a graph representing the number of accesses for which the identifier 2201 of the table 2200 is "delivery information 3". A reference numeral 5100 is a setting range for which the identifier 2201 of the managing table 2200 is "delivery information 1". A reference numeral 5300 is a setting range for which the identifier 2201 of the managing table 2200 is "delivery information 2". A range between broken lines 6003 indicates a request area of positional relation information.

Assume in the example that a PT request is issued for a wide area. The request is received in step 1501 of FIG. 8. In step 1502, "delivery information 1", "delivery information 2", and "delivery information 3" are obtained from the positional relation information managing table 2200 as positional relational information in the request area. A check is made in step of 1503 to determine whether or not the display range of the request is "maximum". Since the display range is "maximum" in this case, control goes to step 1505 of FIG. 8. In step 1505, a calculation is conducted to obtain the access ranking of the request area. The numbers of accesses respectively of "delivery information 1", "delivery information 2", and "delivery information 3" are 290, 90, and 85, respectively. Therefore, the results are displayed in an order of "delivery information 1", "delivery information 2", and "delivery information 3".

Assume that the user issues a PT request with a narrower range of the request area. The request is received in step 1501 of FIG. 8. In step 1502, "delivery information 1", "delivery information 2", and "delivery information 3" are obtained from the positional relation information managing table 2200 as positional relational information in the request area. A check is made in step 1503 to determine whether or not the display range of the request is "maximum". Since the display range is other than "maximum" in this case, control goes to step 1504 of FIG. 8.

Since the noise removal processing has not been executed, the system executes the noise removal processing in step 1400 of FIG. 8. Description will now be given of the noise removal processing by referring to FIG. 17.

Figure 17:
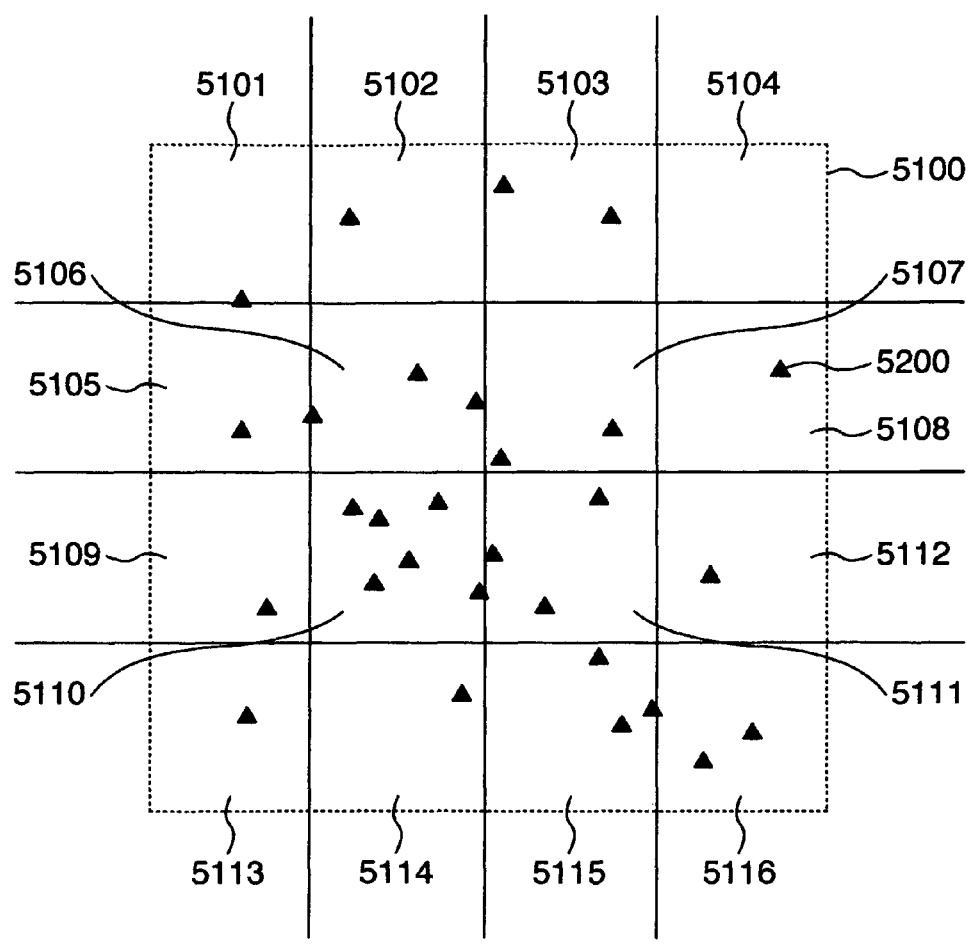
FIG. 17 is a diagram showing part of FIG. 15 associated with only accesses to positional relation information with a delivery information identifier 2201 set as "delivery information 1"

FIG. 17 shows a section of FIG. 15, the section including only the accesses associated with the positional relation information for which the delivery information identifier 2201 is "delivery information 1". FIG. 17 shows the positional relation information items in partitions 5101 to 5116.

In step 1401 of FIG. 9, the request area is divided into partitions, i.e., partitions 5101 to 5116 of FIG. 17. In step 1402, the numbers of accesses respectively of the partitions 5101 to 5116 are extracted from the access log table 2300. It is assumed in the example that the numbers of accesses respectively of the partitions 5101 to 5116 are 10, 10, 20, 0, 10, 30, 20, 10, 10, 60, 30, 10, 10, 10, 30, and 20, respectively.

In step 1403, a calculation is made to obtain a mean value of the numbers of accesses of the partitions. In this example, the mean value is obtained as about 18.1. In step 1404, variance is calculated using the mean value, specifically, the variance $\sigma^2$ is obtained as 203. In step 1405, the value of deviation is calculated as 72 using the mean value "18", the variance "203", and the number of accesses "50" in the request area of "delivery information 1". In step 1406, the deviation "72" resultant from step 1405 is set as the number of accesses.

Since step 1400 is conducted for all positional relation information items in the request area, the value of deviation is similarly calculated as 98 using the mean value "6", the variance "25", and the number of accesses "30" in the request area of "delivery information 2". In this situation, the ranking list is created in an order of "delay information 2", "delay information 3", and "delay information 1" in step 1506 of FIG. 8.

[Display Example on Personal Digital Assistant]

Description will now be given of a display example of supply information displayed on the personal digital assistant 3 in response to a PT request issued by the user.

Figure 18:
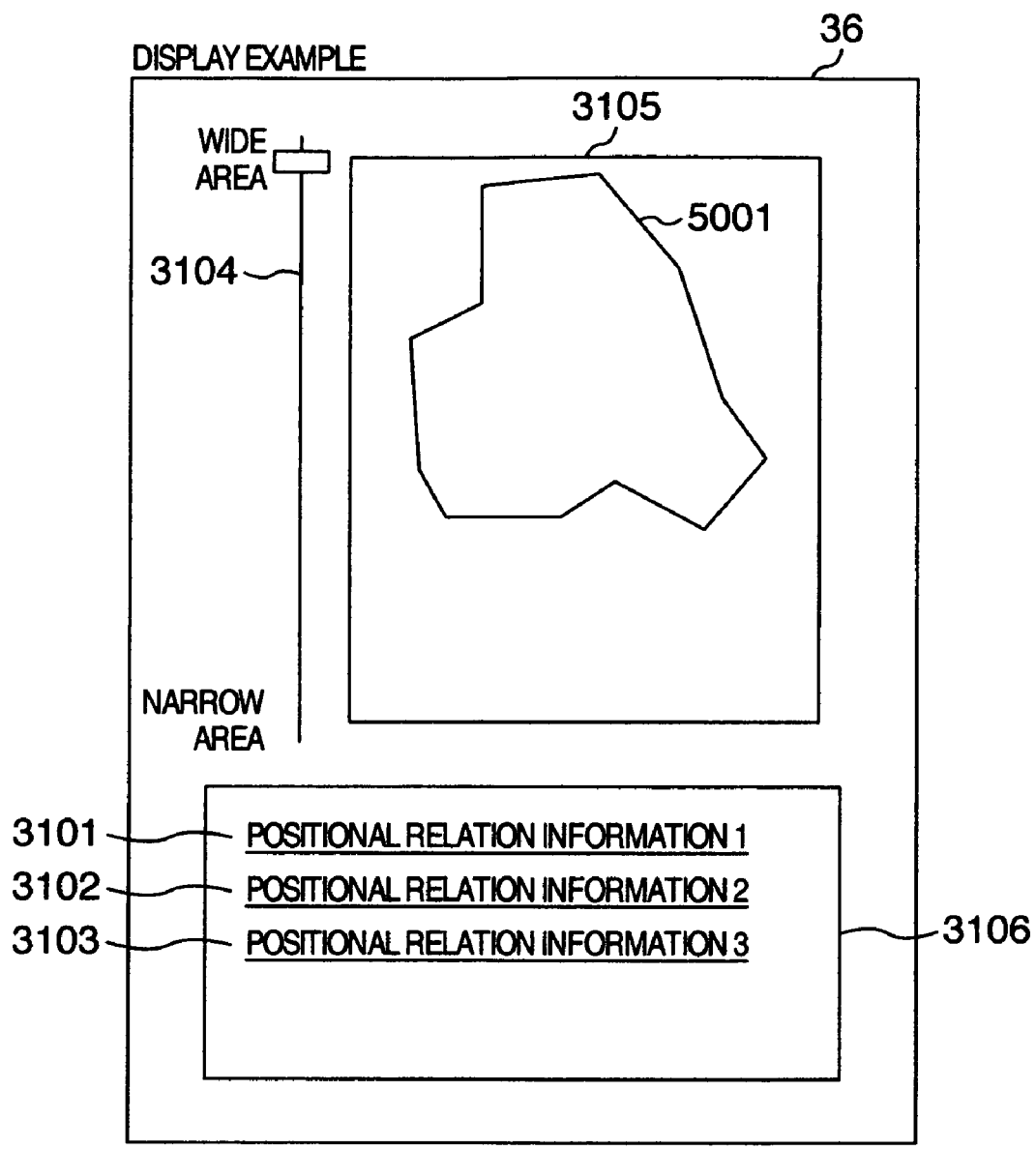
FIG. 18 is a display example of a ranking list on a personal digital assistant 3 when the display range of a portable-terminal request is "maximum"

FIG. 18 is a display example of the ranking list on the personal digital assistant 3 when the display range of the request is "maximum".

In this example, the ranking list is transmitted from the managing server 1 when the user transmits the PT request from the personal digital assistant 3. The list is displayed on the display 36 of the personal digital assistant 3.

On the display 36, the system displays a map display area 3105 for a map near the position designated by the request and a ranking list display area 3106 for the ranking list set at the position. On the left side of the map display area 3105, a slide bar 3104 is displayed as an interface for the map display selection between the wide-area and narrow-area display modes. To select a range for the calculation of the access ranking of the request, the user adjusts the slide bar 3104 by use of the input section 35 of the personal digital assistant 3. It is assumed in the example that the access ranking is displayed each time the user adjusts the slide bar 3104. However, it is also possible to provide an interface for the user to indicate timing to transmit the PT request.

The map display area 3105 displays a map 5001 near the position indicated by the request. The ranking display area 3106 displays the ranking list of positional relation information items set in an area being displayed in the map display area 3105, the ranking list including positional relation information titles in a ranking order. In the example of FIG. 18, the slide bar 3104 is set to "wide area" and the display area is "maximum". Therefore, the ranking list displayed in the ranking display area 3106 is calculated on the basis of the number of accesses for which the noise removal has not been conducted.

In FIG. 18, "positional relation information 1" 3101, "positional relation information 2" 3102, "positional relation information 3" 3103 are examples of positional relation information titles displayed in the ranking list of positional relation information. In FIG. 15, "positional relation information 1" is allocated to the delivery range 5100 and "positional relation information 2" is allocated to the delivery range 5300.

Since the display range is set to "maximum", the PT request processing section 1500 of the managing server 1 obtains the ranking on the basis of the total of the numbers of accesses of the respective delivery information items. In FIG. 16, information items allocated to the area are the numbers of accesses, i.e., 290, 90, and 85 respectively of "delivery information 1", "delivery information 2", and "delivery information 3". The ranking list hence includes "delivery information 1", "delivery information 2", and "delivery information 3" in this order. The titles respectively of "delivery information 1", "delivery information 2", and "delivery information 3" are "positional relation information 1", "positional relation information 2", and "positional relation information 3", respectively. Therefore, the ranking list display area displays "positional relation information 1" 3101, "positional relation information 2" 3102, and "positional relation information 3" 3103 in this order.

When positional relation information is selected by the input section 35 of the personal digital assistant 3, an acquisition request including user information, information of a current position, and a delivery information identifier of the selected positional relation information is transmitted via the network 4 to the managing server 1. The positional relation information supply section 1300 of the managing server 1 records in the access log table the request as delivery information referred to as above. The communication module 12 of the managing server 1 then transmits the positional relation information text via the network 4 to the personal digital assistant 3. The display 26 of the personal digital assistant 3 displays the positional relation information text.

Figure 19:
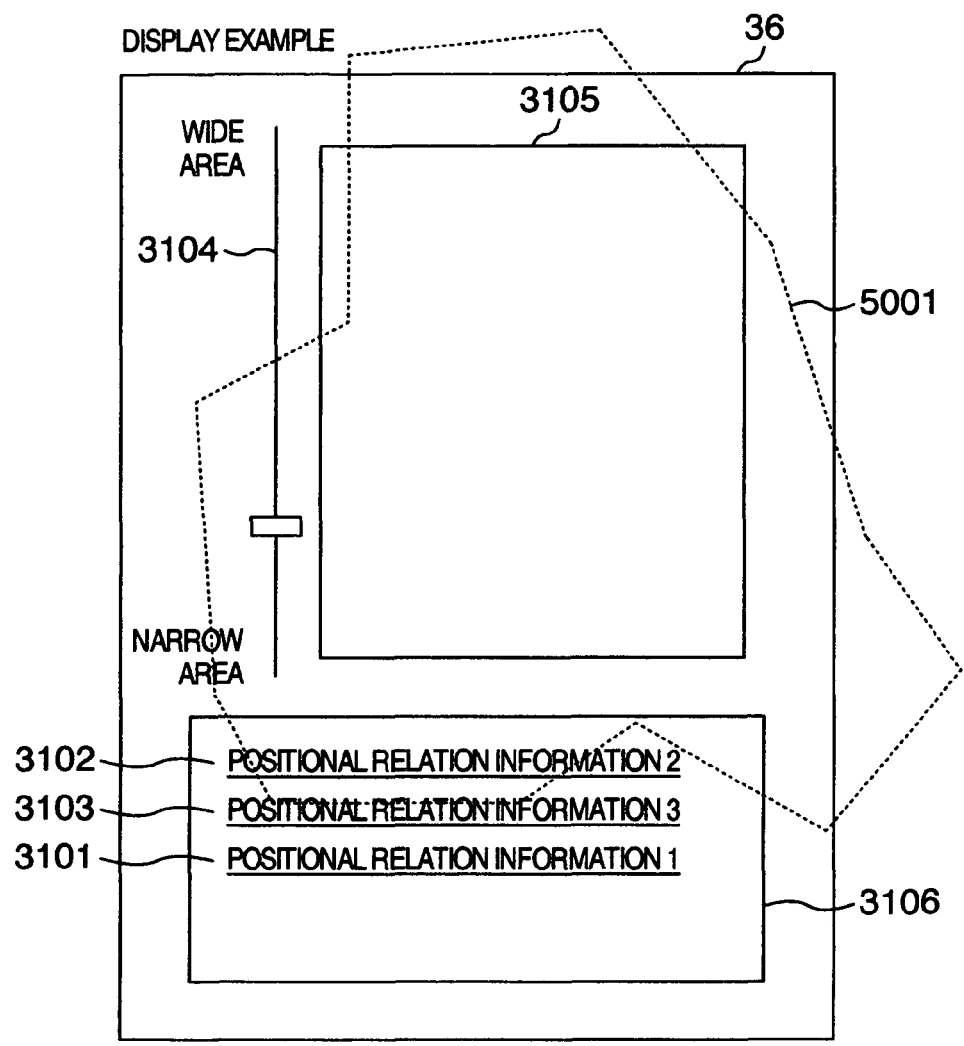
FIG. 19 is a display example of a ranking list on a personal digital assistant 3 when the display range of the portable-terminal request is other than "maximum"

FIG. 19 is a display example of the ranking list on the personal digital assistant 3 when the display range of the PT request is other than "maximum".

In the example, the slide bar 3104 is set to "narrow area" and the display range is other than "maximum". Therefore, the positional relation information displayed on the ranking display area 3016 is calculated on the basis of the numbers of accesses after the noise removal is carried out.

When the user moves the slide bar 3104 on the display 36 of the personal digital assistant 3, the map information is changed in size in the screen 3105. The area size of the screen 3105 is set according to the request area. In response to the operation of the slide bar 3104, the communication module 32 of the personal digital assistant 3 sends the PT request via the network 4 to the managing server 1. The PT request processing section 1500 calculates the access ranking of the positional relation information, and the communication module 12 of the managing server 1 transmits the access ranking via the network 4 to the personal digital assistant 3. The display 36 of the personal digital assistant 3 displays the access ranking of the positional relation information to thereby change the access ranking.

In FIG. 19, "positional relation information 2" 3102, "positional relation information 3" 3103, and "positional relation information 1" 3101 are examples of titles of the positional relation information displayed in the ranking list of the positional relation information.

In FIG. 15, "positional relation information 1" is allocated to the delivery range 5100 and "positional relation information 2" is allocated to the delivery range 5300.

Since the display range is other than "maximum", the PT request processing section 1500 of the managing server 1 assumes that the request is issued for a narrow range or area, and hence obtains the ranking by use of the deviation of the numbers of accesses of the respective delivery information items. In FIG. 16, the values of deviation respectively of the information items allocated to the area, i.e., "delivery information 1", "delivery information 2", "delivery information 3" are calculated using expressions (1) to (3) to obtain 72, 98, and 84, respectively. The access ranking is hence displayed in the order of "delivery information 2", "delivery information 3", "delivery information 1". The titles respectively of "delivery information 2", "delivery information 3", and "delivery information 1" are "positional relation information 2", "positional relation information 3", and "positional relation information 1". Therefore, in the ranking list display area, "positional relation information 2" 3102, "positional relation information 3" 3103, and "positional relation information 1" 3101 are displayed in this order.

When positional relation information item is selected by the input module 35 of the personal digital assistant 3, an acquisition request including user information, information of a current position, and a delivery information identifier of the selected positional relation information is transmitted via the network 4 to the managing server 1. The positional relation information supply section 1300 of the managing server 1 records in the access log table the request as delivery information referred to as above. The communication module 12 of the managing server 1 then transmits the positional relation information text via the network 4 to the personal digital assistant 3. The display 26 of the personal digital assistant 3 displays the positional relation information text.

FIG. 20 shows a display example on the personal digital assistant 3 when the acquisition request is issued for positional relation information.

The display 36 of the personal digital assistant 3 displays the positional relation information title 3201 and the positional relation information text 3202 requested by the acquisition request as well as a "read continuous part" link 3203 displayed when the positional relation information text cannot displayed at a time and a "view next information" link 3204 to acquire information of the next ranking list.

Figure 22:
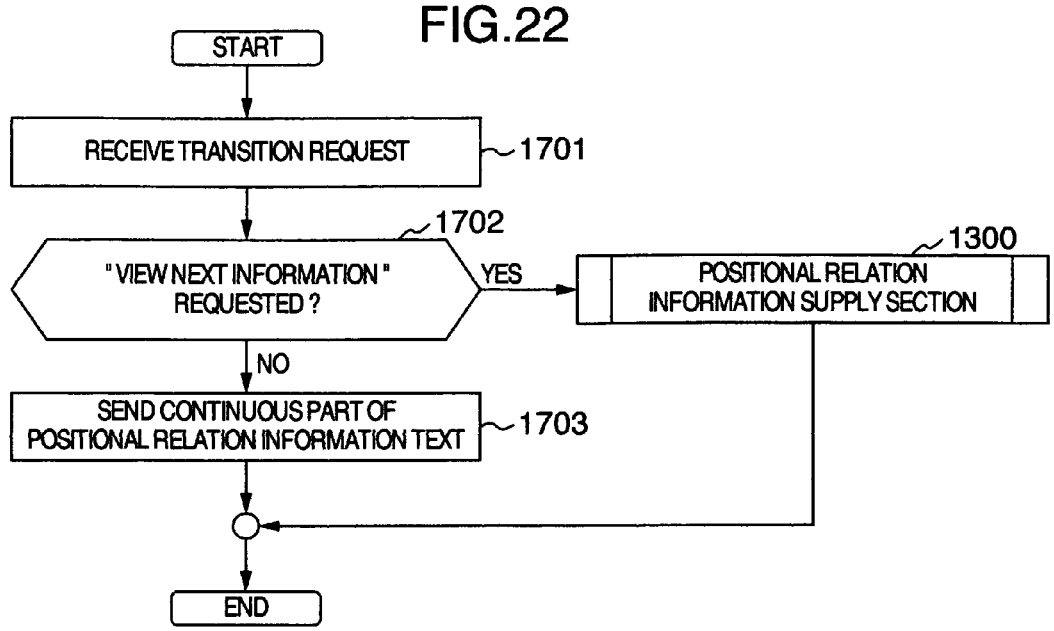
FIG. 22 is a flowchart to explain processing of the transition processing section 1700 of the managing server 1 in the second embodiment.

If the user selects "read continuous part" 3203 using the input section 35 of the personal digital assistant 3, the managing server 1 receives from the communication module 12 a transition request in step 1701 of FIG. 22 to determine whether the request designates "read continuous part" or "view next information". Since "read continuous part" 3203 is designated in this example, the managing server 1 transmits in step 1703 of FIG. 22 by the communication module 12 the continuous part of the text via the network 4 to the personal digital assistant 3.

If the user selects "view next information" 3204 using the input section 35 of the personal digital assistant 3, the managing server 1 receives from the communication module 12 a transition request in step 1701 of FIG. 22 to determine whether the request designates "read continuous part" or "view next information". Since "view next information" 3204 is indicated, the system displays in step 1300 of FIG. 22 positional relation information having a ranking level subsequent to the ranking level of the positional relation information currently being displayed. Although only two links of "read continuous part" and "view next information" are provided in the example, the present invention is also applicable even if another transition request, for example, "view previous information" is provided.

Second Embodiment

According to the second embodiment, in an information delivery system on the basis of positional information as described in conjunction with the first embodiment, a check is made to determine whether or not the supplied positional relation information is useful for the user. If the information is useful, a weight is assigned to the access. Using the number of accesses thus assigned with a weight, the ranking is calculated so that more useful information is displayed with higher priority.

[Overall System Configuration]

The second embodiment is configured almost in the same way as for the first embodiment shown in FIG. 1.

[Tables in Secondary Storage]

In the second embodiment, the tables in the secondary storage are substantially equal to those of the first embodiment excepting that a weight column 2304 is added to the access log table 2300.

Description will be given of the access log table 2300 in the second embodiment.

FIG. 21 shows in detail the data items stored in the access log table 2300. In response to a PT request sent from the personal digital assistant 3 to the managing server 1, a ranking list is displayed on the display 36 of the personal digital assistant 3. When the user selects positional relation information from the ranking list by use of the personal digital assistant 3 for an acquisition request, the system records the event of the selection in the access log table 2300. The table 2300 includes a request identifier column 2301 to uniquely identify the request, an acquisition position column 2302 to indicate a position for which the PT request is issued, a weight column 2304 indicating whether or not the information is useful for the user, and a delivery information identifier column 2303.

[Overall System Configuration]

Description will now be given of a processing flow in the overall information delivery system on the basis of positional information according to the second embodiment.

The basic processing flow is similar to that of the first embodiment.

The processing of the system control program 1100 of the managing server 1 is substantially the same as for the first embodiment, and hence description thereof will be avoided.

Also, the processing to set positional relation information in the client terminal 2 is substantially the same as for the first embodiment, and hence description thereof will be avoided.

Furthermore, the processing of the positional relation information setting section 1200 when the managing server 1 receives a setting request from the client terminal is substantially equal to the processing flow of the first embodiment, and hence description thereof will be avoided.

Next, description will be given of the processing of the PT request processing section 1500 when the managing server 1 receives a PT request from the personal digital assistant 3.

FIG. 8 is a flowchart to explain the processing of the request processing section 1500 of the managing server 1. The processing section 1500 is a program to be executed when a PT request is received from the personal digital assistant 3.

Steps 1501 to 1504 and step 1400 are almost equal to those of the first embodiment, and hence description thereof will be avoided.

Description will be given of the processing in step 1505.

In the second embodiment, the weight column 2304 of the access log table 2300 is used to calculate the access ranking. If the weight column includes a value of three, the number of accesses is assumed as three in the access log.

The communication module 12 sends the access ranking via the network 4 to the personal digital assistant 3 (step 1506) and then the processing is terminated.

FIG. 9 is a flowchart to explain the processing of the noise removing section 1400 of the managing server 1. The section 1400 is a program which is executed to remove accesses as noise, the accesses having the value of the display range set to other than maximum.

The processing flow of step 1401 is substantially the same as for the first embodiment, and hence description thereof will be avoided.

Next, description will be given of the processing in step 1402.

By use of the access log table 2300, the number of accesses is extracted therefrom for each partition of positional relation information set in the setting range. In the processing, the weight column of the table 2300 is used to obtain the number of accesses.

The processing flow of step 1403 and subsequent steps is substantially the same as for the first embodiment, and hence description thereof will be avoided.

Description will now be given of the processing of the positional relation information supply section 1300 when the managing server 1 receives an acquisition request from the personal digital assistant 3.

FIG. 11 is a flowchart to explain the processing of the information supply section 1300 of the managing server 1. The supply section 1300 is a program to be executed when a supply information request is received from the personal digital assistant 3.

In the second embodiment, the supply section 1300 receives by the communication module 12 an acquisition request sent from the personal digital assistant 3 (step 1301).

The section 1300 adds a record to the access log table 2300 (step 1302). Specifically, in the record, a value unique in the request identifier column is set to the request identifier column 2301, positional relation information contained in the acquisition request is set to the positional relation information column 2302, the weight "2" is set to the weight column 2304, and a delivery information identifier is set to the delivery information identifier column 2303. The section 1300 obtains from the positional relation information managing table 2200 the positional relation information text 2205 of a record of which the delivery information identifier column 2201 matches the delivery information identifier of the acquisition request. The section 1300 transmits by the communication module 12 the text 2205 via the network 4 to the personal digital assistant 3 (step 1303) to thereby terminate the processing. If the amount of information of the text 2205 exceeds the predetermined display area of the display 36 of the digital assistant 3, the section 1300 sends only a part of the text 2205.

FIG. 22 is a flowchart to explain the processing of the transition processing section 1700 of the managing server 1 in the second embodiment. The processing section 1700 is a program to be executed when a transition request is received from the personal digital assistant 3.

The transition processing section 1700 receives by the communication module 12 a transition request transmitted from transition processing section 1700 (step 1701). The processing section 1700 accesses the access log managing table to obtain the values of the request identifier column 2301 and the weight column 2305 from the access log of positional relation information accessed by the personal digital assistant 3 at issuance of the transition request (step 1704). The processing section 1700 checks the contents of the transition request. If "view next information" is requested, the processing section 1700 subtracts one from the weight value to set the result as a new weight (step 1706), obtains a positional relation information text of the next ranking by the positional relation information delivery section 1300, and sends the text by the communication module 12 via the network 4 to the personal digital assistant 3 (step 1300) to thereby terminate the processing. If "read continuous part" is requested, the processing section 1700 adds one to the weight value to sets the result as the new weight (step 1705) and then sends the continuous part of the text (step 1703). Next, the processing section 1700 accesses the access log table 2301 to update the weight column 2305 of the record matching the request identifier obtained in step 1704 (step 1707), to thereby terminate the processing.

In the second embodiment, an event in which the continuation part of the text is referred to or an event in which the next information is referred to is employed to calculate the weight. However, the present invention is applicable also to a case using a method in which the user evaluates positional relation information to employ the result of evaluation as the weight or a case using a method in which the period of time used to access positional relation information is employed as the weight.

[Display Example of Client Terminal 2]

Figure 23:
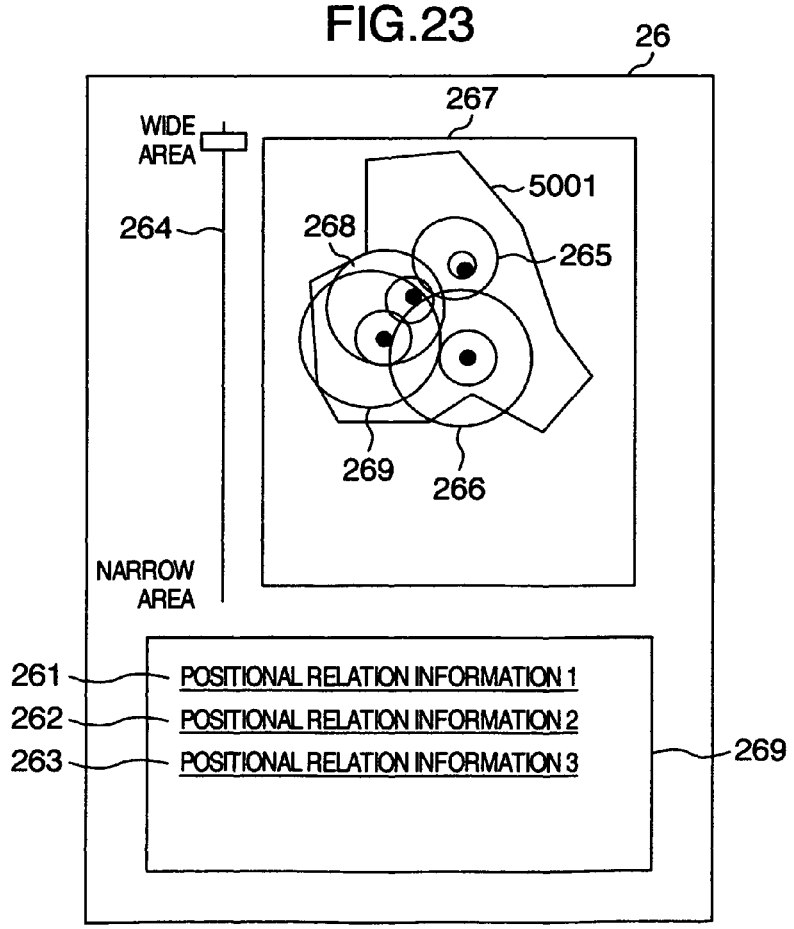
FIG. 23 is a display example of a screen presented on a display 26 of a client terminal 2 when positional relation information is set in the client terminal 2.

FIG. 23 is a display example of a screen displayed on the display 26 of the client terminal 2 when positional relation information is set in the terminal 2.

When the client terminal 2 activates the information delivery system based on positional information, the managing server 1 similarly executes processing for the PT request from the personal digital assistant 3. Specifically, there are displayed on the display 26 a map display area 267 to display a map and a ranking list display area 269 to display the access ranking set at the position. In the client terminal 2, information of the position to display the map is designated by use of the mouse 22 and the keyboard 24. On the left side of the map display area 265, a slide bar 264 is displayed as an interface for the map display selection between the wide-area and narrow-area display modes. To select a location to set positional relation information, the user adjusts the slide bar 264 by use of the mouse 22 and the keyboard 24 of the client terminal 2. It is assumed in the example that the access ranking is displayed each time the user adjusts the slide bar 264. However, it is also possible to provide an interface for the user to indicate timing to transmit the access ranking.

In the ranking list area 269, the system displays a ranking list of positional relation information items set in the area displayed on the map display area 267, specifically, a list of positional relation information titles in the ranking order. That is, "positional relation information 1" 261, "positional relation information 2" 262, and "positional relation information 3" 263 are examples of the titles displayed in the ranking list of positional relation information.

In the map display area 369, it is possible to display a map 5001 near the position where positional relation information is set. In the map, an access log associated with positional relation information is displayed as a heat map. The heat map is created in step 1505 of FIG. 8 described in conjunction with the first embodiment, on the basis of access logs obtained from each access log table 2300.

FIG. 23 includes heat maps respectively of "positional relation information 1" 265, "positional relation information 2" 266, "positional relation information 3" 268, and "positional relation information 4" 269. Assume that a column indicating whether the PT request from the personal digital assistant 3 is for "wide range" or "narrow range" is added to the access log table 2300. In a case in which the request is for "wide range", if a heat map of positional relation information which the user has accessed as wide-area information is moved to a narrow range by adjusting the slide bar 264, there can be displayed the heat map of the positional relation information accessed in the respective states.

The user allocates positional relation information by referring to the information thus displayed, and it is hence possible to effectively determine the setting position and range.

Moreover, the embodiments may be changed and modified in various ways within the scope of the present invention. For example, in a situation in which map information is being displayed on a display of a personal computer, the positional information of the current position of the user can be obtained by picking an associated point on the map by a mouse or the like. In this case, the positional relation information items set in the setting range within the map display area can be displayed with added values in conformity with the ranking information according to the present invention. Furthermore, in an operation in which the positional relation information titles are displayed on a display of the personal digital assistant 3 or the like, if there exists positional relation information of which the ranking becomes higher, a mark is favorably assigned thereto according to the magnitude of the change in the ranking. This favorably notifies the condition to the user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information delivery system comprising portable terminals and a managing server in which information is delivered to portable terminals belonging to an information delivery range, wherein:

each of the portable terminals comprises:

a request range acquisition section for acquiring a first request range and a second request range, a positional information acquisition section for acquiring positional information of the portable terminal, and a request transmission section for transmitting a first information delivery request including the first request range and the positional information and a second information delivery request including the second request range and the positional information; and the managing server comprises:

log information to store delivery information and positional information delivered to a portable terminal in the past, wherein the managing server is configured to calculate, on the basis of positional information and a first request range of a first information delivery request, and a number of accesses of the respective delivery information items belonging to the first request range, wherein the managing server is configured to calculate, on the basis of positional information and a second request range of a second information delivery request, and a number of accesses of the respective delivery information items belonging to the second request range, wherein the managing server is configured to determine an information delivery rank of the e number of accesses of the respective delivery information items belonging to the first request range and the number of accesses of the respective delivery information items belonging to the second request range, and wherein the managing server is configured to transmit delivery information associated with the information delivery rank to the portable terminal.

2. An information delivery system according to claim 1, wherein the managing server is configured to determine the information delivery rank of the delivery information items on the basis of the number of accesses of the respective delivery information items belonging to the first request range, the number of accesses of the respective delivery information items belonging to the second request range, and a value of deviation.

3. An information delivery system according to claim 1, wherein:

a portable terminal comprises means for designating a range; and the managing server is configured to calculate the information delivery rank each time the range is changed and is configured to supply the information delivery rank to the portable terminal.

4. An information delivery system according to claim 1, wherein the managing server is configured to assign, as a weight to calculate the number of accesses of the respective delivery information items, a state of access when the delivery information delivered to the portable terminal is used by the portable terminal.

5. An information delivery system according to claim 1, wherein:

the first request range is a maximum request range available for the portable terminal;

the second request range is a narrow request range narrower than the maximum request range; and the managing server processes the number of accesses of the respective delivery information items belonging to the second request range on the basis of statistic values including a mean value and variance obtained using the number of accesses of the respective delivery information items belonging to the maximum request range and thereby determines the information delivery rank.

6. An information delivery system according to claim 1, wherein:

the managing server comprises access log storage means for storing as the log information therein whether the delivery information items are accessed as wide-area information or as narrow-area information; and the managing server is configured to supply, in an operation to designate a setting position of the delivery information items, reference information to set a size of an information supply range, on the basis of the log information stored in the access log storage means.

7. An information delivery system according to claim 1, wherein:

the managing server is configured to create, when the delivery information items are set with designation of the position, a heat map of access information associated with the delivery information items and is configured to display the heat map on a map in a range including the position thus designated.

8. An information delivery method of delivering information to portable terminals belonging to an information delivery range, comprising the steps of:

acquiring by each of the portable terminals a first request range and a second request range as well as positional information of the portable terminal;

transmitting by a portable terminal a first information delivery request including the first request range and the positional information and a second information delivery request including the second request range and the positional information;

storing as log information by a managing server delivery information and positional information delivered to the portable terminal in the past;

calculating by the managing server a number of accesses of the respective delivery information items belonging to the first request range on the basis of the positional information and the first request range of the first information delivery request;

calculating by the managing server a number of accesses of the respective delivery information items belonging to the second request range on the basis of the positional information and the second request range of the second information delivery request;

determining by the managing server an information delivery rank of the delivery information items on the basis of the number of accesses of the respective delivery information items belonging to the first request range and the number of accesses of the respective delivery information items belonging to the second request range; and transmitting by the managing server delivery information associated with the information delivery rank to the portable terminal.

9. An information delivery method according to claim 8, wherein the information delivery rank of the delivery information items is determined on the basis of the number of accesses of the respective delivery information items belonging to the first request range, the number of accesses of the respective delivery information items belonging to the second request range, and a value of deviation.

10. An information delivery method according to claim 8, wherein:

the information delivery rank is calculated each time a range thus designated is changed on the portable terminal; and the information delivery rank is supplied to the portable terminal.

11. An information delivery method according to claim 8, wherein a state of access when the delivery information delivered to the portable terminal is used by the portable terminal is assigned as a weight to calculate the number of accesses of the respective delivery information items.

12. An information delivery method according to claim 8, wherein:

the first request range is a maximum request range available for the portable terminal;

the second request range is a narrow request range narrower than the maximum request range; and the number of accesses of the respective delivery information items belonging to the second request range is processed on the basis of statistic values including a mean value and variance obtained using the number of accesses of the respective delivery information items belonging to the maximum request range to thereby determine the information delivery rank.

13. An information delivery method according to claim 8, wherein:

whether the delivery information is accessed as wide-area information or as narrow-area information is stored as the log information; and reference information to set a size of an information supply range is supplied on the basis of the log information thus stored, in an operation to designate a setting position of the delivery information.

14. An information delivery method according to claim 8, wherein:

when the delivery information is set with designation of the position, a heat map of access information associated with the positional relation information beforehand set is displayed on a map in a range including the position thus designated.

15. An information delivery method, comprising the steps of:

storing access information of the past, the access information being associated with reception of information delivery requests from a plurality of portable terminals;

obtaining, when an information delivery request of delivery information is received from a portable terminal with designation of an information acquisition range, positional information of the portable terminal;

adjusting, according to the range thus designated, a ranking of the delivery information on the basis of the access information; and supplying the ranking thus adjusted to the portable terminal.

16. An information delivery method according to claim 15, further comprising the steps of:

determining, if narrow-area information is designated by the portable terminal in the adjustment of the ranking of the delivery information on the basis of the access information, whether or not a number of accesses to a wide range is noise by use of a value calculated on the basis of a value calculated using the number of accesses of the delivery information allocated in a wide range and the range and a value calculated using a number of accesses of the delivery information set to a narrow range and the range; and executing, if the number of accesses is noise, processing of correcting the number of accesses by using the value calculated as above.

17. A non-transitory computer-readable medium comprising program code for causing when executed, a computer system, to perform a method of information delivery, comprising:

a portable-terminal request processing step of processing a request for delivery information, the request being received from a portable terminal:

a supply step of supplying the delivery information associated with a request for acquiring delivery information selected by a user from a delivery information list processed by the portable-terminal request processing step; and a transition processing step of processing a request which requests other information and/or a page transition when the delivery information is displayed on the portable terminal.

18. An information delivery program according to claim 17, wherein the portable-terminal request processing step comprises a noise removal processing step for selecting delivery information having higher priority at a position requested by the user.

19. An information delivery program according to claim 17, further comprising a delivery information setting step of processing a request which sets information received from a client terminal.

* * * * *